United States Patent

[11] 3,603,799

[72] Inventor Tsukumo Nobusawa
Asaka-shi, Japan
[21] Appl. No. 810,767
[22] Filed Mar. 26, 1969
[45] Patented Sept. 7, 1971
[73] Assignee Asahi Kogaku Kogy Kabushiki Kaisha
Tokyo-to, Japan
[32] Priority Apr. 1, 1968, Mar. 10, 1969
[33] Japan
[31] 43/21022 and 44/17860

[54] LIGHT MEASURING DEVICE COMPRISING A PLURALITY OF BINARY CIRCUITS FOR PROVIDING A DIGITAL REPRESENTATION OF PHOTOCELL OUTPUT
7 Claims, 4 Drawing Figs.

[52] U.S. Cl. .................................................. 250/214 R,
315/154, 340/347 AD, 356/227
[51] Int. Cl. ...................................................... H01j 39/12,
G01j 1/42
[50] Field of Search .......................................... 250/214;
356/227; 315/153, 154; 340/347 AD; 324/103 P;
95/10 C

[56] References Cited
UNITED STATES PATENTS

| | | | |
|---|---|---|---|
| 2,486,391 | 11/1949 | Cunningham | 340/347 AD |
| 2,838,663 | 6/1958 | Goldberg | 340/347 AD |
| 2,869,115 | 1/1959 | Doeleman et al. | 340/347 AD |
| 3,319,116 | 5/1967 | Schick | 315/154 X |

*Primary Examiner*—James W. Lawrence
*Assistant Examiner*—T. N. Grigsby
*Attorney*—Stanley Wolder

ABSTRACT: A light measuring device includes successive transistor Schmitt triggers having emitter resistors of successively higher resistances, the collector of the input transistor of each trigger being connected through a diode to the emitters of the next successive trigger. A voltage divider includes a photoconductor and resistor series connected across a battery the voltage across the resistor being applied to the Schmitt triggers. The trigger outputs are connected to lamps and may be connected to relay solenoids which control the insertion of resistances in a shutter timing RC network. The photoconductor may control the charging of a capacitor which is coupled through a high impedance input amplifier to the Schmitt trigger inputs.

INVENTOR
TSUKUMO NOBUSAWA
BY Stanley Wolder
ATTORNEY

LIGHT MEASURING DEVICE COMPRISING A PLURALITY OF BINARY CIRCUITS FOR PROVIDING A DIGITAL REPRESENTATION OF PHOTOCELL OUTPUT

BACKGROUND OF THE INVENTION

The present invention relates generally to improvements in measuring networks and it relates particularly to an improved light measuring network which provides a visual incremental or stepwise indication of the intensity of the measured light.

For displaying in a stepwise manner the parameters of a measured scene, many steps are generally required. In the case of an exposure meter system, the factors for determining the display value are the brightness of the scene to be photographed (LV value), the sensitivity value of the film used (ASA value), and the shutter time or the diaphragm value. From such factors the display requires from 8 (the minimum) to 20 steps. For such multistep display by the corresponding number of lamps a large number of lamps would be required. To control the lighting of so many lamps so as to assure accurate and distinct display is very difficult for the following reasons:

In view of the lighting characteristic of lamps, the brightness of a lighted lamp depends upon the applied voltage, it takes some time for a lamp to attain the expected brightness after application of voltage, the electric change of the sensing element detecting the state of the measured scene is very low, and lighting of a plurality of lamps for display is apt to cause an erroneous reading.

Assuming now that such display is to be made with an arrangement of lamps of different lighting voltages, even with an amplifier to obtain an electric power necessary for lighting of lamps in response to the weak electrical change of the sensing element, it would be difficult to cause a distinct turning on and off the lamps if the electrical change of the sensing element takes place very slowly in response to the change of the state of the measured scene. If a higher lighting voltage is applied to a lamp of lower lighting voltage, the lamp is damaged. With such an arrangement of lamps of different lighting voltage, the number of the lighted lamps increases with the display steps so that it is hard to read the displayed steps. Thus, such a structure cannot be practically utilized.

SUMMARY OF THE INVENTION

It is a principal object of the present invention to provide an improved electrical measuring apparatus.

Another object of the present invention is to provide an improved light measuring apparatus.

Still another object of the present invention is to provide a light measuring apparatus having an improved measurement indication display.

A further object of the present invention is to provide an apparatus of the above nature characterized by its reliability, versatility, adaptability and clarity and convenience of display.

The above and other objects of the present invention will become apparent from a reading of the following description taken in conjunction with the accompanying drawings which illustrate preferred embodiments thereof.

In a sense the present invention contemplates the provision of a measuring device comprising a plurality of successive networks each switchable between alternative first and second states, means coupled to each of said switch networks and responsive to the state thereof, a sensing means for providing a signal in response to a sensed condition, and means for controlling each of said switch networks in response to said sensing means signal and the state of a switching network adjacent thereto. In its preferred form the switching networks are transistor Schmitt triggers in which the collector of the input transistor of each trigger network is connected through a diode to the emitters of the transistors of the next successive trigger and the emitter resistors are of successively larger resistance. The sensing element is a photoconductor and is connected in series with a resistor across a battery and the voltage across the resistor is applied to the inputs of the Schmitt triggers. Electric lamps are connected in the trigger outputs. A modified apparatus includes a memory capacitor shunted by a log diode and connected through a photoconductor to a battery and through an amplifier to the Schmitt trigger inputs. Relay solenoids connected to the trigger outputs actuate switches for selectively connecting resistors in a timing RC circuit of a camera shutter control network.

The present improved network provides a sequential display of successively alternatively energized lamps in which the lamp turning on and off control can be carried out through weak signals of the sensing element; the continuous electrical change of the sensing element is converted, through the operation of an electron circuit, into discontinuous increment changes so that the lamp turning on and off action is made more distinct; an electrical feedback arrangement is provided between adjacent step sections of sequentially arranged lamp turning on and off control system so that lighting of the two neighboring display lamps is mutually so controlled as to light only such lamp that corresponds to the step reading to be displayed.

DESCRIPTION OF THE PREFERRED EMBODIMENTS

Figure 1:
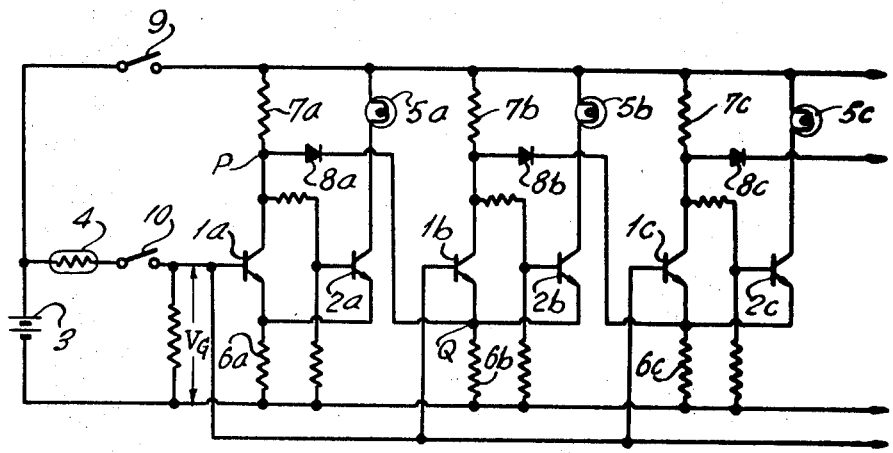
FIG. 1 is a circuit diagram of a preferred embodiment of the present invention.

Referring now to the drawings, and particularly FIG. 1 thereof which illustrates a preferred embodiment of the present invention as applied to a photometer, a plurality of successive Schmitt trigger circuits of known construction are provided, the first trigger including an interconnected pair of first and second transistors 1a and 2a and all being powered by a common battery 3.

In the base input signal circuit of the transistor 1a there is series connected a photoconductor 4 serving as a sensing element. A step display lamp 5a is series connected in the collector circuit of the transistor 2a. An emitter resistor 6a is provided for the transistor 1a and functions, as is well known, as an output discrimination control resistor in connection with input signals. The first step display section is thus constituted by a circuit comprising the above elements for controlling current supply to the lamp 5a. Such sections corresponding in number to the intended display steps are connected to a common input signal circuit, have respective resistors 6b, 6c, ... corresponding to emitter resistor 6a and having sequentially different resistance values, and are parallelly connected to battery 3. In each section as shown in the drawing, elements of the same functional nature are indicated by numerals and characters which are similar to those of said first section. The junctions P of the collectors and the collector resistors 7a, ... of the transistors 1a, ... of corresponding sections, are respectively through forwardly connected diodes 8a, 8b, ... to the point q of the emitter circuits of the transistors 1b, ... of the next sections. Further shown in the drawing are a current source switch 9 and a signal circuit switch 10 which is series connected in the input signal circuit.

The operation of the exposure meter system described above is as follows:

When the current source switch 9 is closed, with the signal circuit switch 10 opened the transistors 1a, 1b, ... of the respective sections are nonconductive, while the other transistors 2a, 2b, ... of the respective sections are conductive because to their respective bases is applied a divided voltage of the battery 3 derived from the base bleeder resistances of the transistors 2a, 2b, ... connected in series with the collector resistors 7a, 7b, of said transistors 1a, 1b, ... Thus, closure of current source switch 9 causes all the step display lamps 5a, 5b, ... , the respective sections to be lighted. Then, upon closure of the signal circuit switch 10 to the base sides of the transistors 1a, 1b, ... is produced a voltage $V_G$ controlled by the photoconductor 4 receiving the light from the scene to be photographed. In response to the base-emitter voltage determined by voltage $V_G$ and the collector resistor values, in certain sections the transistor corresponding to the transistor 1a becomes conductive and the other transistor nonconductive, that is, the Schmitt circuit is reversed, so that the corresponding lamps are turned off.

Upon closure of the signal circuit switch 10 the sections effect a discriminating action of the input signal according to the emitter voltages due to the established values of respective emitter resistors 6a, 6b, .... This discriminating action is controlled by the feedback circuits connecting adjacent sections through the diodes 8a, 8b, ... This control action between the first and the second sections (assuming that the emitter resistance 6a < the emitter resistance 6b, is as follows: When the resistance value of the photoconductor 4 as a sensing element in response to the scene brightness is not large enough to reverse said first section as mentioned before, that is, the base input signal $V_G$ is low, the first section transistor 1a remains nonconductive and the lamp 5a is lighted. In this state the junction P of the collector side of the transistor 1a is at a positive potential, and the corresponding voltage is applied through the diode 8a to the point Q of the emitter side of the second section transistor 1b. Then, in the second section the emitter potential is far greater than that determined by the emitter resistor 6B at the establishment of the section. Thus, the transistor 2b becomes nonconductive due to the rise of said emitter potential far beyond that value which permits the conduction control of the transistor 2b (the temporary disabling of the discriminating function of the section) so that turning off of the corresponding lamp 5b is assured.

As the scene to be photographed becomes slowly less and less bright, the resistance value of the sensing photoconductor 4 becomes slowly greater and greater, until the first section transistor 1a becomes conductive. Then the other transistor 2a becomes nonconductive, the corresponding lamp 5a is turned off. At the same time, the potential of the junction P drops abruptly, so that the potential of the point Q of the emitter side of the second section returns to the value determined by the emitter resistor 6b. The established value for the second section is somewhat smaller than the established value for the said reverse operation of the first section in response to the input signal. Thus, the second section is now reversed abruptly and the corresponding lamp 5b is turned on upon turning off of lamp 5a.

The above-mentioned reversing operation between the two neighboring sections sequentially advances through the arranged sections. As mentioned above, with a slow change of scene brightness, the reversal of each section is assured by the exchange operation between the two neighboring sections due to said feedback operation. For this reason, also with a scene of constant brightness, between the neighboring sections of the corresponding brightness step display of the above-mentioned feedback operation is carried out so that only the lamp of the section of the corresponding step display is turned on and the lamps of all other sections are not lighted. The displayed step can be readily known by inspecting the position of the lighted lamp.

It has been found that the feedback circuit can function if a mere conductor is utilized therefor without inserting a diode. However, if a time gap is produced between turning off of the first section lamp 5a and turning on of the second section lamp 5b, and if the circuit design produces such state that during such time gap the transistor 1a is conductive and the potential of the junction P is very low due to the degree of saturation of the transistor 1a and is lower than the potential of the point Q of the emitter side of the next section, then it is desirable to utilize said diode to prevent a reversed current flow to assure the function and result of the device according to the present invention.

Thus, according to the present invention, the turning on and off of the step display lamps is controlled by a Schmitt circuit system so that the input signal of of the weak and continuous electrical change of the sensing element may produce stepwise discontinuous turning on and off of said lamps, thus providing distinct lamp display of the continuous change of the input signal. Further feedback circuits are provided such that the switching signal due to discriminating action of the input signals to a section functions as a control signal for the discriminating action of the next section. Accordingly, only such display lamp that corresponds in step to the input signal, and the lamp-lighting control is performed in such a manner that each of the arranged lamps is lighted with a preceding one turned off simultaneously and this lighting action advances sequentially through the arranged lamps. Thus, the device according to the present invention enables the user to read the step display very easily, providing great practical advantage.

In the above-described example, the discriminating operation of the input signal by the sections comprising the Schmitt circuits is controlled by adjustment of there resistance values of the emitter resistors 6a, 6b, ... The function and result of the present invention is also obtained when, instead of the above means, sensitivity adjusters for the basses of the section transistors 1a, 1b, ... are provided in the input signal circuit. The intended lamp lighting control can also be made if the lamp is inserted in the collector circuit of the other transistor of each section, and in some intended cases such arrangement is preferable.

Although the above description has been made in connection with an example of an exposure meter system, it is to be understood that the application of the present invention is not limited to exposure meter systems and that the present invention may be applied to various machines and instruments as lamp digital display means.

Figure 2:
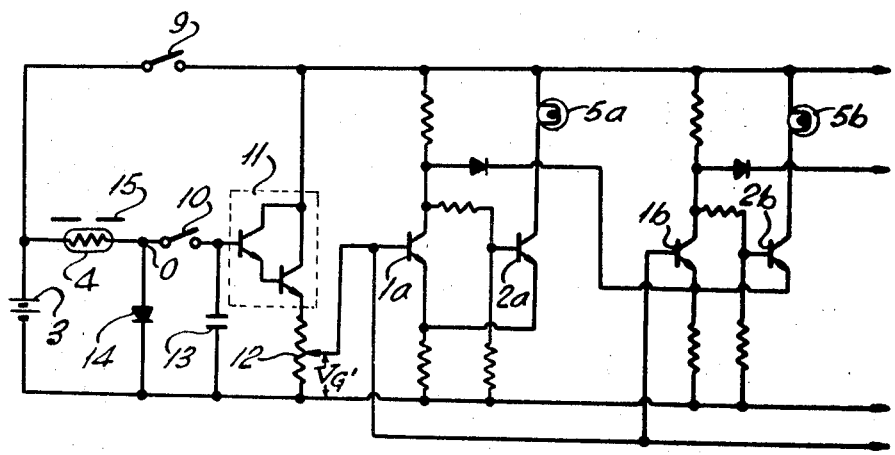
FIG. 2 is a circuit diagram of another embodiment of the present invention.

Now referring to FIG. 2 diagrammatically showing another embodiment of the invention adapted to be used for an exposure time display system so as to provide an appropriate indication in response to brightness of a scene to be photographed, the base input signal circuit of each transistor 1a, 1b, .... of respective display steps is connected to a slidable contact of a potentiometer 12 serially connected in a current control circuit of a high input impedance transistor 11 and a capacitor 13 is connected between the control electrodes of transistor 11. Capacitor 13, photoconductor 4, and the signal circuit switch 10 are series connected to the battery 3. A log diode 14 is connected in a forward current direction between a node 0 of said photoconductor 4 and said signal circuit switch 10 and the negative electrode of battery 3 in such a manner that a voltage develops at said node 0, which varies in arithmetic progression relative to diploid variation (a geometric progression with a common ratio of 2) of brightness of a scene to be photographed which is applied to photoconductor 4. A diaphragm mechanism 15 is arranged in the light path to photoconductor 4 so that a diaphragm value thereof is set according to either a diaphragm value preset in setting an amount of exposure of an associated camera or of film sensitivity, while a slidable contact of potentiometer 12 is moved according to the rest of said two values.

With the display system last described, light from a scene to be photographed is applied to the photoconductor 4 directed to said scene in the situation that a diaphragm value of the diaphragm mechanism and a position of the slidable contact of potentiometer 12 have initially been set according to a diaphragm value of the camera and a sensitivity value of the film used, respectively, or vice versa. Said photoconductor 4, therefore, constitutes a resistor having a value corresponding to the brightness of the scene to be photographed and said diaphragm value or sensitivity value. In a current circuit of the battery 3 including said photoconductor 4 and the log diode 14, both serially connected therein, a voltage at the node 0, due to the current in log diode 14 in response to a transient current corresponding to data detected by photoconductor 4, i.e., the voltage characteristic, varies in form of an arithmetic progression relative to diploid variation of a current in response to said data. Upon closure of the signal circuit switch 10, therefore, accumulation of the capacitor 13 is achieved up to the level corresponding to a voltage at said node 0. The high input impedance transistor 11 effects a current control according to the voltage across capacitor 13, i.e. a voltage at said node 0 and thereby a voltage $V_G'$ develops at the slidable terminal of the potentiometer 12 in thus controlled current circuit, said voltage varying in form of an arithmetic progression relative to said rest of said diaphragm value or sensitivity value according to which said data or said potentiometer has been preset.

The display sections comprising components such as the transistors 1a, 1b, ... and 2a, 2b, ... and the lamps 5a, 5b, ... operate in the manner of the embodiment illustrated by FIG. 1, upon closure of the current source switch 9, into the condition wherein said lamps 5a, 5b, ... are controllably put on and out in response to a signal voltage of the signal input circuit. With this embodiment as illustrated by FIG. 2, thus, only the lamp specially adapted to response to the voltage $V_G'$ of said potentiometer 12 is put on and the other lamps are put out since said voltage $V_G'$ serves as a signal voltage for said display sections. This means that a display step may be easily identified by determining the position of the lit lamp. Furthermore, even in the case that the signal circuit switch 10 is opened after an accumulating operation for said capacitor 13, said capacitor 13 is not readily discharged and its voltage is kept constant for a relatively long time since said transistor 11 of which the control signal is the terminal voltage of said capacitor 13 is a transistor of high input impedance. Consequently, the current control operation of said transistor 11 is also kept constant for a relatively long time and thereby the display operation is also kept constant at least for a sufficient time to determine the position of the lit lamp.

Figure 3:
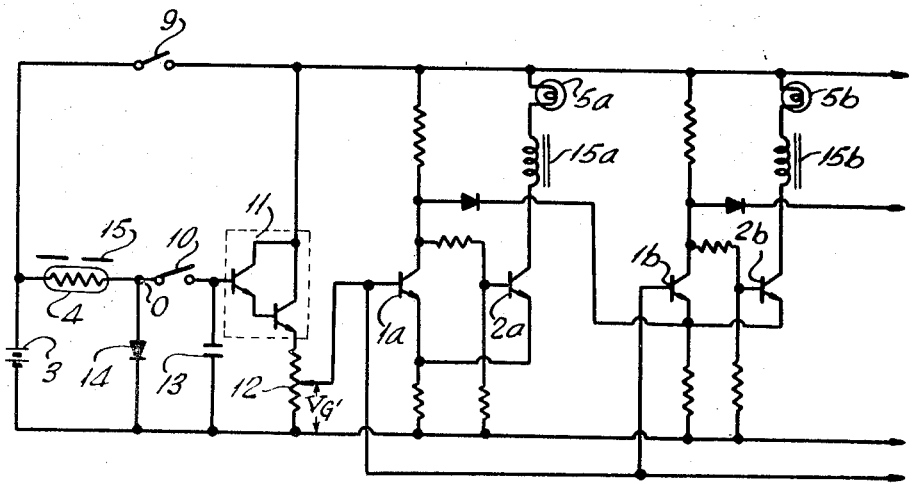
FIG. 3 is a circuit diagram of still another embodiment of the present invention.
Figure 4:
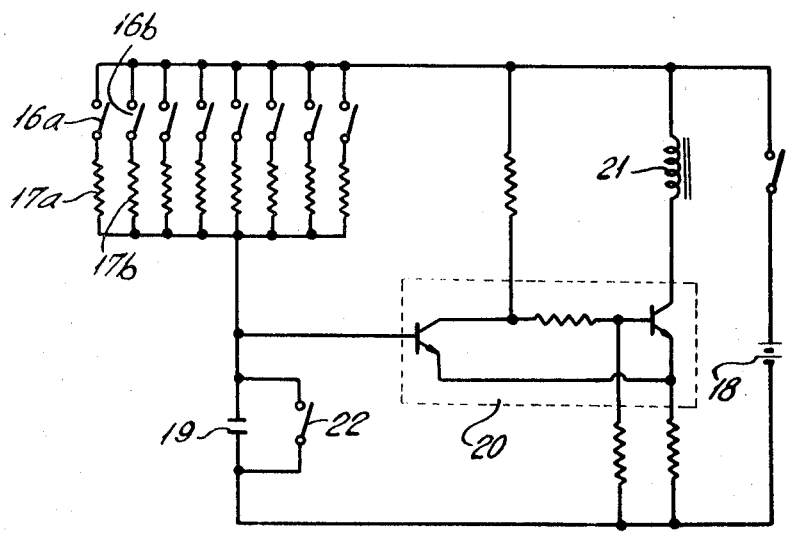
FIG. 4 is a circuit diagram of a shutter control network associated with the network of FIG. 3.

FIGS. 3 and 4 show a further embodiment according to this invention wherein a camera shutter is automatically controlled in accordance with a displayed time. A display system for such a shutter control must include some additional arrangement in the circuit of the embodiment illustrated by FIG. 2. More specifically, relays 15a, 15b, are connected in series or in parallel to the lamps 5a, 5b, respectively, in such a manner that lamp 5a and relay 15a, lamp 5b and relay 15b, ... are simultaneously energized, respectively. An exposure time control circuit comprises switches 16a, 16b, ... operating in response to relay solenoids 15a, 15b, ..., respectively, resistors 17a, 17b, ... of different resistance values each serially connected to the corresponding one of said switches, a plurality of such series connected pairs being connected in turn in parallel to one another and inserted between connection of a battery 18 and a timing capacitor 19. The exposure time control circuit thus includes an RC timing circuit due to each resistance of said resistors 17a, 17b, ... and said timing capacitor 19. An electromagnet 21 for starting the shutter closure is series connected in the current circuit that is regulated by a switching transistor network 20 actuated upon application of a terminal voltage of said timing capacitor 19. A switch 22 normally closed is connected in parallel to said timing capacitor 19 in such a manner that said switch 22 is opened synchronously with opening of the shutter. When the display sections energize a lamp occupying a position at which an exposure time for appropriate exposure is displayed according to factors such as brightness of a scene to be photographed, a preset diaphragm value, and a sensitivity value of film used, a relay which is energized synchronously with said lamp is excited and thereby the corresponding switch is closed.

The RC timing circuit included in the exposure time control circuit thus consists of the resistors serially connected to the closed switches, respectively, and the timing capacitor 19. It is in this situation that the shutter button of camera is depressed to start opening of the shutter and at the same time open the switch 22 connected in parallel to the timing capacitor 19. In exceptional cases, for example, in the case that photoconductor 4 is located in a path along which light from a scene to be photographed is applied through the objective of a single lens reflex camera to said photoconductor 4, said light may be blocked by the release starting operation. In view of such a possibility, a countermeasure is usually considered such that the signal circuit switch 10 is opened well before the release starting.

When accumulation of the timing capacitor 19 is started with a current regulated by the resistance as previously described and thereby the interterminal voltage of capacitor 19 reaches a predetermined value, the switching transistor mechanism 20 that has been conductive for energizing the electromagnet 21 becomes nonconductive. As a result, said electromagnet 21 that has blocked the shutter closure because said electromagnet 21 has been energized and therefore excited is released from its blocking operation and starts the shutter closure. The shutter operation is controlled in this manner and a time during which the shutter is opened depends on a time set by the timing circuit, i.e., the value of the resistor serially connected to the switch closed in response to an energized relay solenoid. If a prearrangement is made such that the resistance values of the resistors 17a, 17b, ... serially connected to the switches 16a, 16b, ... respectively, which operate in response to the relays 15a, 15b, ..., are the set times of said timing circuit according to the exposure times displayed by the lamps 5a, 5b, ..., respectively, the exposure times according to displaying operation of said lamps 5a, 5b, ... can be automatically controlled with the embodiment as illustrated in FIGS. 3 and 4.

While there have been described and illustrated preferred embodiments of the present invention it is apparent that numerous alterations and additions may be made without departing from the spirit thereof.

I claim:

1. A light responsive device comprising sensing means including a photocell for providing an output signal in response to the light incident on said photocell, a plurality of successive Schmitt trigger circuits each of which includes a pair of first and second transistors having interconnected emitters, a common emitter resistor, bases and collectors, means connecting the collector of each of said first transistors to the emitters of the transistors of the following switch circuit, means for applying said output signal to the bases of said first transistors, and electric lamps connected to the outputs of said Schmitt circuits.

2. A light control device comprising a plurality of successive switching networks each switchable between alternative first and second states, means including a photocell for providing an output signal in response to the light incident on said photocell, means for controlling each of said switch networks in response to said output signal and the state of the preceding switch network, a relay solenoid connected to an output of each of said switch networks, a shutter control network including a timing capacitor, a plurality of resistors, and means including switches actuated by said solenoids for alternatively connecting said resistors in a series timing circuit with said capacitor.

3. A measuring device comprising a plurality of successive switch networks each switchable between alternative first and second states, a sensing means including a photocell for providing an output signal in response to the light incident on said photocell, each of said switch networks being coupled and responsive to said sensing means output signal and the state of the preceding switching network, a shutter timing network including a timing capacitor and a variable resistor network coupled thereto, and means responsive to the states of said switch networks for controlling the resistance at said resistor network.

4. The measuring device of claim 1 wherein said networks comprise Schmitt trigger circuits having successively different trigger voltages.

5. The measuring device of claim 4 comprising an electric lamp coupled to the output of each of said Schmitt circuits.

6. A light measuring device in accordance with claim 3 wherein said switch networks comprise Schmitt circuits each including a pair of first and second transistors having interconnected emitters, a common emitter resistor, bases and collectors, the collector of each of said first transistors being connected to the emitters of the transistors of the following switch network, and the bases of said first transistors being coupled to said sensing means output signal, and electric lamps connected to outputs of said Schmitt circuits.

7. The light measuring device of claim 6 wherein said emitter resistors of said Schmitt circuits are of different resistances.

UNITED STATES PATENT OFFICE
CERTIFICATE OF CORRECTION

Patent No. 3,603,799             Dated September 7, 1971

Inventor(s) TSUKUMO NOBUSAWA

It is certified that error appears in the above-identified patent and that said Letters Patent are hereby corrected as shown below:

On the front page of the patent the Assignee is ASAHI KOGAKU KOGYO KABUSHIKI KAISHA Signed and sealed this 28th day of March 1972.

(SEAL)
Attest:

EDWARD M. FLETCHER,JR.             ROBERT GOTTSCHALK
Attesting Officer                  Commissioner of Patents